2,882,173
GLASS COMPOSITION

William W. Welsch, Granville, Ohio, assignor to Owens-Corning Fiberglas Corporation, a corporation of Delaware No Drawing. Application June 20, 1955
Serial No. 516,785

8 Claims. (Cl. 106—50)

This invention relates to a glass composition which is especially adapted for the manufacture of glass articles such as fibrous glass and the like.

Fibers have been produced in the past by various methods from glass, slag, fusible rock, and various other materials. Commercial manufacture of fibers from molten glass has been accomplished by subjecting the softened material to high velocity gaseous blasts which attenuate the material to fibers. Steam, compressed air, and hot exhaust gases from a combustion burner have been used as attenuating forces in the known process. Recent processes utilize centrifugal forces for delivering bodies of glass into an annularly shaped gaseous blast which attenuates the glass into very fine fibers having high quality and greatly improved physical properties. For a description of one such process, see U.S. Patent 2,609,566, Slayter and Stalego.

The glass composition to be used with such a process must have particular physical properties which make it possible to use the glass in the process. The rotary process referred to comprises delivering into a rotor or spinner operating at high speed the material which has been heat-softened. The material is then directed outwardly through openings in the periphery of the spinner as individual bodies which are delivered generally radially of the spinner into the annular blast from a burner. The glass compositions of this invention are melted by conventional practices known to the art and require no special treatment during melting or fining.

It is an object of this invention to provide a glass composition having a low liquidus temperature, a wide range of temperatures at which the glass can be attenuated, and a slow rate of devitrification.

It is also an object to provide an improved glass composition especially adapted for use with a rotary process for producing fibrous glass.

It has been discovered that a glass comprising silica and the usual glass-forming ingredients plus an addition of boric oxide and a compound containing fluorine provides the physical properties which are desired for producing fibrous glass by a rotary process. The glass compositions of this invention may be utilized in other fiber-forming processes in which it is desirable to have a wide range of fiber-forming or attenuating temperatures.

A suitable glass composition comprises the following ingredients expressed in weight percent:

| Ingredients: | Proportion |
|---|---|
| $SiO_2$ | 50 to 65 |
| $Al_2O_3$ | 0 to 8 |
| $CaO$ | 0 to 10 |
| $MgO$ | 0 to 10 |
| Alkali ($Na_2O$ and $K_2O$) | 10 to 20 |
| $B_2O_3$ | 3 to 10 |
| $CaF_2$ | 5 to 15 |
| $TiO_2$ | 0 to 8 |
| $ZrO_2$ | 0 to 8 |

A preferred range of proportions for the various ingredients in the glass compositions is as follows:

| Ingredients: | Proportion |
|---|---|
| $SiO_2$ | 52 to 63 |
| $Al_2O_3$ | 2 to 6 |
| $CaO$ | 1 to 9 |
| $MgO$ | 1 to 9 |
| Alkali ($Na_2O$ and $K_2O$) | 12 to 18 |
| $B_2O_3$ | 4 to 9 |
| $CaF_2$ | 6 to 14 |
| $TiO_2$ | 2 to 6 |
| $ZrO_2$ | 2 to 6 |

The following examples are compositions which have been prepared and used in fiber forming processes.

Example 1

| Ingredients: | Proportion |
|---|---|
| $SiO_2$ | 56.6 |
| $Al_2O_3$ | 2.9 |
| $CaO$ | 1.6 |
| $MgO$ | 1.1 |
| $Na_2O$ and $K_2O$ | 14.0 |
| $B_2O_3$ | 5.9 |
| $CaF_2$ | 8.8 |
| $TiO_2$ | 4.5 |
| $ZrO_2$ | 4.6 |

The liquidus temperature of this glass is 1755° F. and the temperature at 1000 poises is 1880° F.

Example 2

| Ingredients: | Proportion |
|---|---|
| $SiO_2$ | 58.2 |
| $Al_2O_3$ | 3.0 |
| $CaO$ | 1.6 |
| $MgO$ | 1.2 |
| $Na_2O$ and $K_2O$ | 16.2 |
| $B_2O_3$ | 6.0 |
| $CaF_2$ | 9.0 |
| $ZrO_2$ | 4.8 |

The liquidus temperature of this glass is 1650° F., the softening point is 1283° F. and the temperature at a viscosity of 1000 poises is 1885° F.

Example 3

| Ingredients: | Proportion |
|---|---|
| $SiO_2$ | 61.4 |
| $Al_2O_3$ | 3.0 |
| $CaO$ | 3.3 |
| $MgO$ | 2.4 |
| $Na_2O$ and $K_2O$ | 14.6 |
| $B_2O_3$ | 6.1 |
| $CaF_2$ | 9.2 |

The liquidus temperature of this glass is 1730° F. and the temperature at 1000 poises is 1835° F.

Example 4

| Ingredients: | Proportion |
|---|---|
| $SiO_2$ | 53.5 |
| $Al_2O_3$ | 3.0 |
| $CaO$ | 5.4 |
| $MgO$ | 3.9 |
| $Na_2O$ and $K_2O$ | 14.4 |
| $B_2O_3$ | 6.0 |
| $CaF_2$ | 9.0 |
| $ZrO_2$ | 4.8 |

The liquidus temperature of this glass is 1715° F. and the temperature at 1000 poises is 1790° F.

Example 5

| Ingredients: | Proportion |
|---|---|
| $SiO_2$ | 57.2 |
| $Al_2O_3$ | 3.0 |
| CaO | 5.5 |
| MgO | 4.0 |
| $Na_2O$ and $K_2O$ | 14.8 |
| $B_2O_3$ | 6.2 |
| $CaF_2$ | 9.3 |

This glass composition has been found to be especially adapted for the rotary process. Its liquidus temperature is 1765°, the softening point about 1177° F., the temperature at a viscosity of 1000 poises is 1755°, and the density is 2.64.

The above glass compositions provide a liquidus temperature of from about 1700° to about 1800° F. This relatively low liquidus makes it possible to run the glass compositions through glass handling apparatus at relatively low temperatures which preserve the life of the glass handling equipment. These glasses have a slow rate of crystal formation and growth. The viscosity of these glasses is lower than the conventional glass compositions used formerly in processes utilizing steam as the attenuating force. The durability of these glasses is good and it has been found that the durability can be improved by adding certain inorganic salts such as aluminum salts to the resinous binders used on the fibers.

It is believed that fluorine is an essential ingredient in the compositons. Fluorine assists in melting, reduces viscosity, reduces liquidus, and improves durability. It has been found that these glasses can be readily melted and fined in large quantities in continuous tanks at glass temperatures of from 2300° to 2350° F. Fluorine lowers the viscosity and, in addition, it has been found that fluorine lowers the liquidus in these compositions by as much as 200° to 300° F. The simultaneous lowering of viscosity and liquidus was an unexpected result and a feature which makes this glass especially adapted for fiber forming. In prior work fluorine has had no effect on the liquidus of the glass compositions tried. Fluorine also improves glass durability due to its acidic nature. Fluorine may be added in various forms; however, it has been found that fluorspar ($CaF_2$) is preferred since it is readily available and for this reason less expensive.

Boric oxide is an essential ingredient and serves a dual function. The boric oxide provides chemical durability in the glass and decreases the viscosity of the glass composition.

Calcium oxide and magnesium oxide are added to the glass composition in order to lower the viscosity and increase the fluidity. Calcia and magnesia ordinarily cannot be tolerated in low liquidus glass compositions; however, the above compositions, even though low liquidus glasses, are improved by the addition of these ingredients. The calcia and magnesia are not essential ingredients but they are preferably added to provide low viscosity.

Titania and zirconia may be used to improve the durability, to lower the liquidus and viscosity, and to lower the devitrification rate. Titania and zirconia are relatively expensive ingredients and may be omitted if a low cost glass is necessary.

Alumina is not an essential ingredient but it does assist in maintaining durability. It may be replaced partially or fully by silica.

Barium oxide may be used to lower the liquidus; however, the use of baria tends to increase the density of the glass and may be undesirable for this reason.

Soda is used as a flux to assist in melting and to lower the viscosity and liquidus. It should not be used in excess since loss of durability will result.

The examples given above are starting or theoretical compositions and the actual glass compositions resulting from melting these batch ingredients may be somewhat different due to the high losses of volatiles including fluorine, $B_2O_3$ and $Na_2O$. Some fluorine is probably retained in the glass formed, however, and it is believed its presence provides some of the properties desired.

The above glass compositions are especially adapted for use in the rotary process where the spinner is preferably operated at a relatively low temperature to reduce the erosion and oxidation of the spinner during use. Low operating temperatures are made possible by the glass compositions disclosed with the result that the spinner and other glass handling apparatus have a greater useful life. High fluidity at the liquidus temperature and at the operating temperature is provided by these compositions.

Various modifications and variations may be made in the present invention within the spirit and scope of the appended claims.

I claim:

1. A glass batch consisting essentially by weight:

| | Percent |
|---|---|
| $SiO_2$ | 52 to 63 |
| $Al_2O_3$ | 2 to 6 |
| CaO | 1 to 9 |
| MgO | 1 to 9 |
| $Na_2O$ and $K_2O$ | 12 to 18 |
| $B_2O_3$ | 4 to 9 |
| $CaF_2$ | 6 to 14 |
| $TiO_2$ | 2 to 6 |
| $ZrO_2$ | 2 to 6 |

2. A glass batch comprising by weight:

| | Percent |
|---|---|
| $SiO_2$ | 57.2 |
| $Al_2O_3$ | 3.0 |
| CaO | 5.5 |
| MgO | 4.0 |
| $Na_2O$ and $K_2O$ | 14.8 |
| $B_2O_3$ | 6.2 |
| $CaF_2$ | 9.3 |
| | 100.0 |

3. A glass batch comprising by weight:

| | Percent |
|---|---|
| $SiO_2$ | 53.5 |
| $Al_2O_3$ | 3.0 |
| CaO | 5.4 |
| MgO | 3.9 |
| $Na_2O$ and $K_2O$ | 14.4 |
| $B_2O_3$ | 6.0 |
| $CaF_2$ | 9.0 |
| $ZrO_2$ | 4.8 |
| | 100.0 |

4. A glass batch comprising by weight:

| | Percent |
|---|---|
| $SiO_2$ | 61.4 |
| $Al_2O_3$ | 3.0 |
| CaO | 3.3 |
| MgO | 2.4 |
| $Na_2O$ and $K_2O$ | 14.6 |
| $B_2O_3$ | 6.1 |
| $CaF_2$ | 9.2 |
| | 100.0 |

5. A glass batch comprising by weight:

| | Percent |
|---|---|
| $SiO_2$ | 58.2 |
| $Al_2O_3$ | 3.0 |
| CaO | 1.6 |
| MgO | 1.2 |
| $Na_2O$ and $K_2O$ | 16.2 |
| $B_2O_3$ | 6.0 |
| $CaF_2$ | 9.0 |
| $ZrO_2$ | 4.8 |
| | 100.0 |

6. A glass batch comprising by weight:

| | Percent |
|---|---|
| $SiO_2$ | 56.6 |
| $Al_2O_3$ | 2.9 |
| CaO | 1.6 |
| MgO | 1.1 |
| $Na_2O$ and $K_2O$ | 14.0 |
| $B_2O_3$ | 5.9 |
| $CaF_2$ | 8.8 |
| $TiO_2$ | 4.5 |
| $ZrO_2$ | 4.6 |
| | 100.0 |

7. As an article of manufacture fibrous glass produced from the following batch:

| | Percent by weight |
|---|---|
| $SiO_2$ | 57.2 |
| $Al_2O_3$ | 3.0 |
| CaO | 5.5 |
| MgO | 4.0 |
| $Na_2O$ and $K_2O$ | 14.8 |
| $B_2O_3$ | 6.2 |
| $CaF_2$ | 9.3 |
| | 100.0 |

8. A glass batch consisting essentially by weight:

| | Percent |
|---|---|
| $SiO_2$ | 53.5–61.4 |
| $Al_2O_3$ | 2.9– 3.0 |
| CaO | 1.6– 5.5 |
| MgO | 1.1– 3.9 |
| $Na_2O$ and $K_2O$ | 14.0–16.2 |
| $B_2O_3$ | 5.9– 6.2 |
| $CaF_2$ | 8.8– 9.3 |
| $TiO_2$ | 0– 4.5 |
| $ZrO_2$ | 0– 4.8 |

References Cited in the file of this patent

UNITED STATES PATENTS

| 2,426,472 | Stanworth | Aug. 26, 1947 |
| 2,429,432 | Stanworth | Oct. 21, 1947 |
| 2,687,968 | Beck | Aug. 31, 1954 |

FOREIGN PATENTS

| 897,060 | France | Mar. 12, 1945 |
| 905,421 | Germany | 1954 |

OTHER REFERENCES

Locke: The Glass Industry, vol. 7, No. 6 (1926), page 136.